(12) United States Patent
Wang et al.

(10) Patent No.: US 8,306,001 B2
(45) Date of Patent: Nov. 6, 2012

(54) DYNAMIC DOWNLINK BEAMFORMING WEIGHT ESTIMATION FOR BEAMFORMING-SPACE TIME CODE TRANSMISSIONS

(75) Inventors: Genyuan Wang, Plano, TX (US); Li Guo, Allen, TX (US); Hanqing Lou, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 12/687,181

(22) Filed: Jan. 14, 2010

(65) Prior Publication Data
US 2011/0170521 A1    Jul. 14, 2011

(51) Int. Cl.
*H04B 7/216* (2006.01)
(52) U.S. Cl. ........ 370/335; 370/252; 370/336; 370/345; 370/534; 455/101; 455/102; 455/103; 375/220; 375/221; 375/267
(58) Field of Classification Search .................... None
See application file for complete search history.

(56) References Cited

U.S. PATENT DOCUMENTS

| 6,694,155 | B1 | 2/2004 | Chin et al. |
| 2003/0021354 | A1* | 1/2003 | Ghavami et al. ............... 375/267 |
| 2003/0035490 | A1* | 2/2003 | Gollamudi .................... 375/267 |
| 2004/0067738 | A1* | 4/2004 | Raghothaman ............... 455/101 |
| 2008/0247330 | A1* | 10/2008 | Ko et al. ........................ 370/252 |

* cited by examiner

*Primary Examiner* — Dai A Phuong
(74) *Attorney, Agent, or Firm* — Edell, Shapiro & Finnan, LLC (57) ABSTRACT

Techniques are provided to improve wireless beamformed communication between first and second wireless communication devices. At a plurality of antennas of the first wireless communication device (e.g., a base station) uplink transmissions sent from the second wireless communication device (e.g., a client or mobile device or station) are received. The first wireless communication device generates a downlink beamforming weight vector from received uplink transmissions, and computes a covariance matrix for received uplink transmissions. The first wireless communication device stores history information based on the covariance matrices for received uplink transmissions. The first wireless communication device computes first and second beamforming-space time code weight vectors based on the covariance matrix for an uplink transmission received in a current frame and the history information. The first wireless communication device uses the first and second beamforming-space time code weight vectors for a beamforming-space time code transmission technique to send a downlink transmission to the second wireless communication device.

20 Claims, 7 Drawing Sheets

BF-STC weight vectors $W1_k$ and $W2_k$ computed dynamically such that performance approximates that of single weight vector beamforming when appropriate and that of BF + STC when appropriate without need to switch between two modes

DYNAMIC DOWNLINK BEAMFORMING WEIGHT ESTIMATION FOR BEAMFORMING-SPACE TIME CODE TRANSMISSIONS

TECHNICAL FIELD

The present disclosure relates to wireless communication and to improving beamforming transmissions to client devices whether they are mobile or stationary.

BACKGROUND

Beamforming involves transmitting data through multiple transmit antennas with an appropriate weight vector to weight the transmit signal across the transmit antennas such that the transmitted signal is coherently combined at the receiving device to achieve beamforming gain between the transmitting device and the receiving device. Beamforming techniques are useful in a variety of wireless communication systems such as a system that employs the techniques of IEEE 802.16, known commercially as a WiMAX™ system. A single beamforming weight vector is used for sending a single data stream using standard beamforming techniques.

Beamforming combined with space time code (STC) techniques, denoted hereinafter "BF+STC", involve combining beamforming and STC techniques to achieve both beamforming gain and spatial diversity gain. In BF+STC applications, two beamforming weight vectors are used. The beamforming weight vectors for both beamforming and BF+STC applications are estimated based on the received uplink frames. The beamforming weight vector is estimated from uplink frames when uplink traffic is available to be sent from a client device to the base station, for example, and then used in the next downlink frame to be sent by the base station to the client device. There may be a period of time after the received uplink transmission that was used to compute the beamforming weight vector before the downlink transmission is to be sent. Thus, the beamforming weight vector may not be reliable when used some period of time after it was computed, particularly when the client device is moving.

DESCRIPTION OF EXAMPLE EMBODIMENTS

Overview

Techniques are provided herein to improve wireless beamformed communications between first and second wireless communication devices. At a plurality of antennas of the first wireless communication device (e.g., a base station), uplink transmissions sent from the second wireless communication device (e.g., a client or mobile device or station) are received. The first wireless communication device generates a downlink beamforming weight vector from received uplink transmissions, and computes a covariance matrix for received uplink transmissions. The first wireless communication device stores history information based on the covariance matrices for received uplink transmissions. The first wireless communication device computes first and second beamforming-space time code weight vectors based on the covariance matrix for an uplink transmission received in a current frame and the history information. The first wireless communication device uses the first and second beamforming-space time code weight vectors for a beamforming-space time code transmission technique to send a downlink transmission to the second wireless communication device. The first and second beamforming-space time code weight vectors are computed dynamically and thereby adjust for changing channel conditions between the first and second wireless communication devices. Furthermore, the first and second beamforming-space time code weight vectors are computed dynamically such that the resulting performance approximates that of single weight vector beamforming when appropriate (e.g., when the second wireless communication device is stationary or relatively slow moving) and that of beamforming-space time coding when appropriate (e.g., when the second wireless communication device is moving) without the need to switch between two transmission modes.

Example Embodiments

Figure 1:
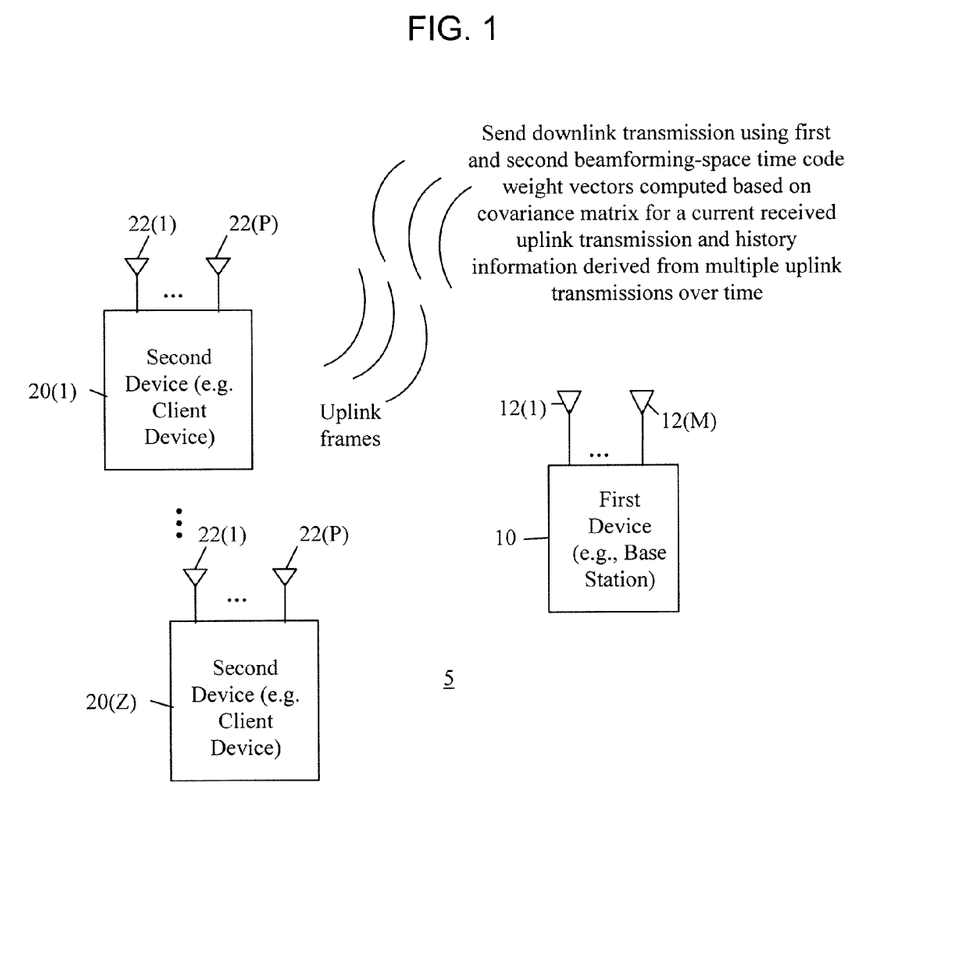
FIG. 1 is a block diagram showing an example of a wireless communication system or network in which a first wireless communication device, e.g., a base station, is configured to derive first and second beamforming weight vectors from received uplink frames from a second wireless communication device, e.g., a client device, where the first and second beamforming weight vectors are used by the base station for BF+STC transmissions to the client device.

Referring first to FIG. 1, a wireless communication network is shown at reference numeral 5, and comprising a first wireless communication device, e.g., a base station, shown at 10 and one or more second wireless communication devices, e.g., client devices, shown at 20(1)-20(Z). The base station 10 comprises a plurality of antennas 12(1)-12(M) and serves wireless communication with the client devices 20(1)-20(Z). Each wireless client device 20(1)-20(Z) comprises at least one antenna, but in general it may comprise a plurality of antennas 22(1)-22(P). The base station 10 may be referred to herein as a first wireless communication device and the wireless client devices 20(1)-20(Z) as second wireless communication devices.

The base station 10 is configured to wirelessly communicate with the client devices 20(1)-20(Z) according to any of a variety of wireless communication standards, examples of which are the IEEE 802.16 standard known commercially as WiMAX™ and the IEEE 802.11 standard known commercially as WiFi™. Furthermore, the base station 10 is configured to send downlink transmissions to a given client device using beamforming techniques.

The base station is configured to send a downlink transmission using BF+STC techniques which involve the use of first and second beamforming vectors. An example of a STC technique is one that uses the Alamouti STC technique whereby for a given transmit data symbol, a first weight vector is applied to the transmit data symbol and a second weight vector is applied to a conjugate of the transmit data symbol.

In both standard beamforming and BF+STC techniques, the weight vectors are derived based on received uplink frames. Due the use of a single beamforming weight vector, standard beamforming (with a single beamforming weight vector) is more sensitive to the accuracy of the estimated beamforming weight vector. BF+STC techniques, on the other hand, use two beamforming weight vectors to achieve spatial diversity and consequently are not as sensitive to the accuracy of the beamforming weight vector estimation.

The estimated beamforming weight vector derived from received uplink traffic from a particular client device in a frame may not be accurate when it is used for a downlink transmission sent several frames later to the particular client device, particularly a mobile client device. For a mobile client device, this time period between the computation of the beamforming weight vector and its use for a downlink transmission can result in beamforming performance several dB worse than that of BF+STC techniques. Furthermore, for each specific client device, there may not be uplink traffic and downlink traffic in every frame. Consequently, the downlink beamforming weight vector used for a current downlink frame may have been estimated from uplink traffic received several frames ago. Again, standard beamforming using a single beamforming weight vector (assuming a single transmit data stream is to be sent) is more sensitive to "aging" effects because only one beamforming weight vector is applied. Any estimation inaccuracies in deriving the beamforming weight vector can significantly impact performance.

Furthermore, most client devices are configured with a single transmitter and therefore transmit uplink frames via a single antenna. As a result, the base station can directly estimate only one beamforming weight vector from the received uplink frame and it derives a second beamforming weight vector from the first beamforming weight vector. At times and in certain channel conditions, this may not be accurate, and can degrade the performance of BF+STC when compared to standard beamforming (with a single beamforming weight vector) to a stationary client device. In other words, the beamforming weight vectors may not match the real channel conditions with respect to a client device, particularly mobile client devices, due to the aforementioned aging effects.

Accordingly, techniques are provided for dynamically generating first and second beamforming weights for BF+STC techniques that work well for both stationary and mobile client devices. To this end, the base station 10 is configured to send a downlink transmission (downlink traffic) to a client device using BF-STC techniques with first and second beamforming weight vectors computed based on a covariance matrix for a received uplink transmission in a current frame and history information derived over multiple received uplink transmissions in prior frames.

Figure 2:
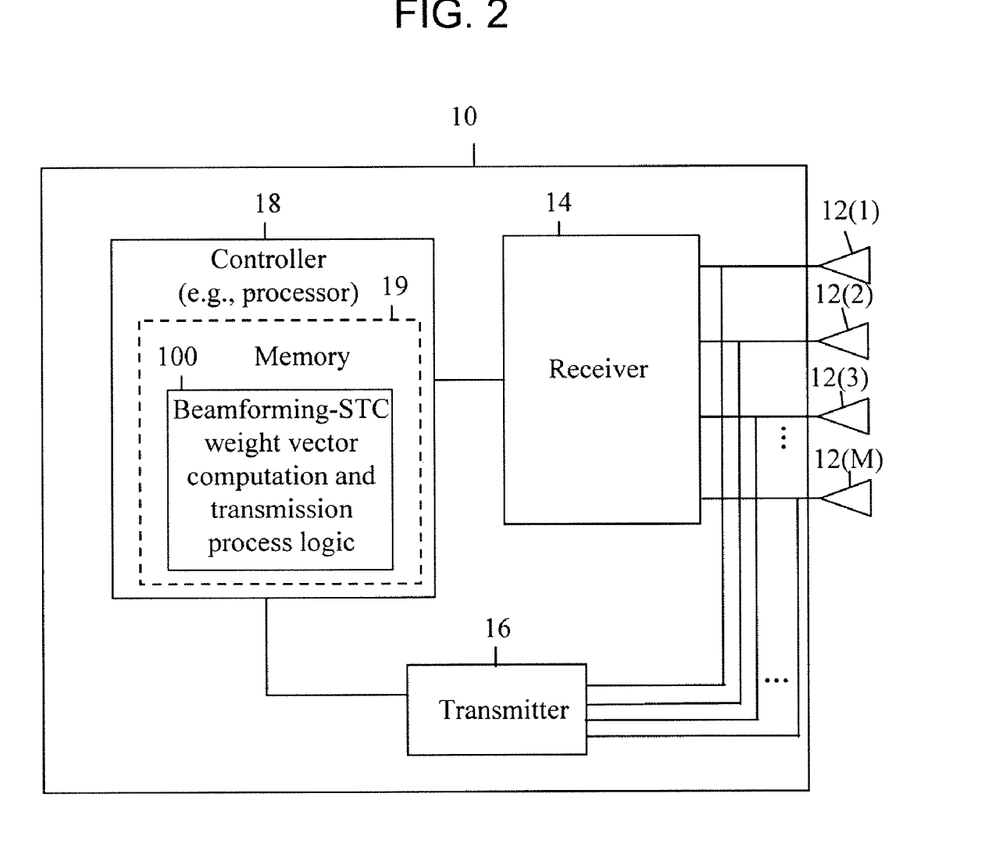
FIG. 2 is an example of a block diagram of a base station configured to derive first and second beamforming-space time code weight vectors used for BF+STC transmissions according to the techniques described herein.

Reference is now made to FIG. 2 for a description of a wireless communication device, e.g., base station 10, that is configured or equipped to perform the aforementioned BF-STC beamforming weight estimation techniques. The base station 10 comprises a receiver 14, a transmitter 16 and a controller 18. The controller 18 supplies data (in the form of transmit signals) to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals at each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown. The controller 18 applies downlink beamforming weight vectors to the downlink transmission stream (e.g., symbol stream) to produce transmit signals. The controller 18 supplies the transmit signals to the transmitter 16 and the transmitter radio frequency (RF) modulates (e.g., upconverts) the respective transmit signals for transmission via respective ones of the plurality of antennas.

The controller 18 is, for example, a signal or data processor that comprises a memory 19 or other data storage block that stores data used for the techniques described herein. The memory 19 may be separate or part of the controller 18. Instructions for BF-STC weight vector estimation and transmission process logic 100 are stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process logic 100 may take any of a variety of farms, so as to be encoded in one or more tangible media for execution, such as with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100. In another form, the process logic 100 may be embodied in a processor readable medium that is encoded with instructions for execution by a processor (e.g., controller 18) that, when executed by the processor, are operable to cause the processor to perform the functions described herein in connection with process logic 100.

As will become more apparent hereinafter, a wireless communication device or apparatus (base station) is provided that comprises a plurality of antennas, a receiver configured to be coupled to the plurality of antennas and to produce receive signals associated with transmissions received at the plurality of antennas from a wireless communication client device, a transmitter configured to be coupled to the plurality of antennas and to produce transmit signals to be transmitted via the plurality of antennas to the wireless communication device, and a controller configured to be coupled to the receiver. The controller is configured to generate a downlink beamforming weight vector from received uplink transmissions, compute a covariance matrix for received uplink transmissions, store history information based on the covariance matrices for received uplink transmissions, and compute first and second beamforming-space time code weight vectors based on the covariance matrix for an uplink transmission received in a current frame and the history information.

Likewise, a processor readable medium is provided that is encoded with or otherwise stores instructions that, when executed by a processor, cause the processor to generate a downlink beamforming weight vector from uplink transmissions received at a plurality of antennas of a first communication device from a second communication device, compute a covariance matrix for received uplink transmissions, store history information based on the covariance matrices for received uplink transmissions, and compute first and second beamforming-space time code weight vectors based on the covariance matrix for an uplink transmission received in a current frame and the history information, wherein the first and second beamforming-space time code weight vectors are used for a beamforming-space time code transmission technique to send a downlink transmission to the second wireless communication device.

Figure 3:
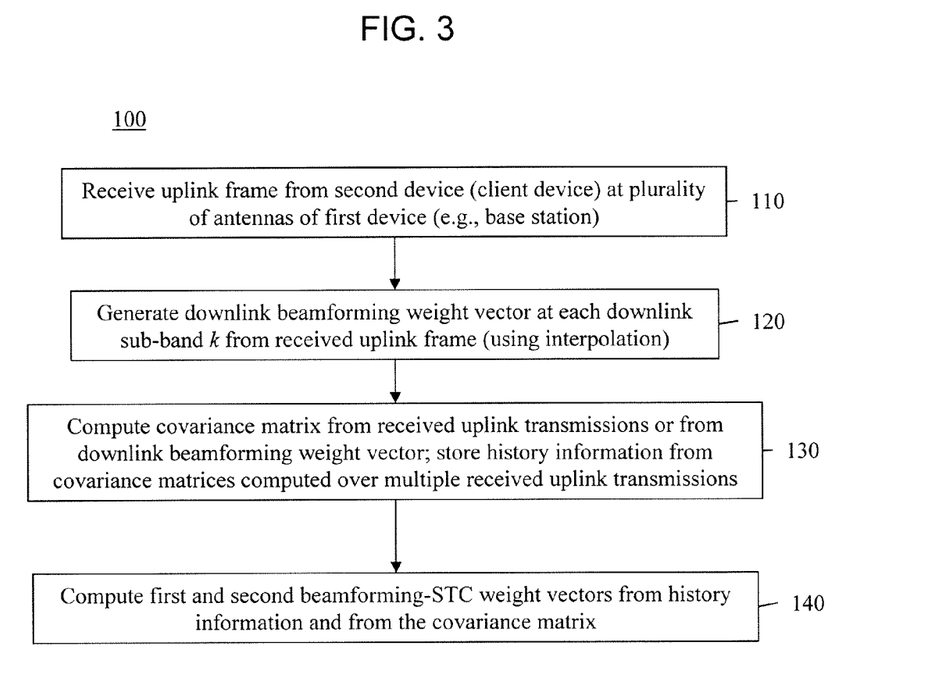
FIG. 3 is an example of a flow chart of a process executed in a base station to derive first and second beamforming-space time code weight vectors used for BF+STC transmissions.
Figure 4:
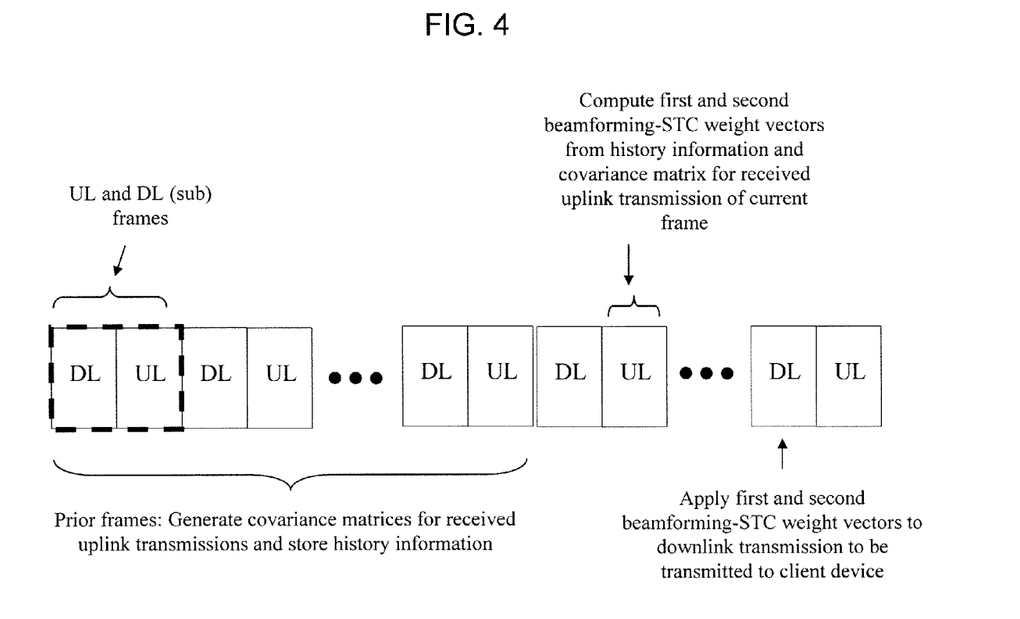
FIG. 4 is a diagram depicting how history information is accumulated from uplink transmissions received over time and used in computing the first and second beamforming-space time code weight vectors according to the process depicted in FIG. 3.

Turning now to FIG. 3 together with FIG. 4, the process logic 100 is described. At 110, the first device, e.g., base station, receives uplink transmissions (traffic) from a second device, e.g., a given client device, at a plurality of antennas of the base station. As shown in FIG. 4, use of the wireless channel is divided into frames, each of which comprises an uplink (UL) subframe and a downlink (DL) subframe. A client device sends an UL transmission to the base station during a given UL subframe and the base station sends a DL transmission to a client device during a given DL subframe. As explained above, several frames may go by between a UL transmission from a particular client device to the base station and the time when the base station sends a DL transmission to that particular client device. This is the aforementioned aging effect.

At 120, the base station generates a DL beamforming weight vector for a particular client device from received UL transmissions from the particular client device. That is, based on each UL transmission received in a frame, the base station computes or updates a downlink beamforming weight vector for the client device from which the UL transmission is received. There are numerous techniques known to perform this computation. When the UL transmissions are made in a different frequency range than DL transmissions, techniques may be employed to derive or interpolate the frequency-sensitive nature of the channel in one frequency range to another frequency range. This is particularly useful in a frequency division duplex (FDD) system and a time division duplex (TDD) system in which UL traffic only occupies a portion of band. An example of such a technique that employs interpolation is described hereinafter.

At 130, the base station computes a covariance matrix (at each UL sub-band in the UL frequency range) based on the received uplink transmission in a current frame (UL subframe). For example, the covariance matrix is computed as $X$ $(CDi)_k = y(CDI)_k y(CDI)_k^H$, where $y(CDi)_k$ is a vector representing a received UL transmission across the plurality of antennas at the base station at UL sub-band k from a given client device i and $^H$ is the Hermitian operation. In a variation, the covariance matrix $X(CDi)_k$ is computed from the beamforming weight vector computed at 120. An example of this variation is described hereinafter. Also at 130, history information from covariance matrices computed over multiple received uplink transmissions is stored.

At 140, the base station computes first and second BF+STC weight vectors based on the covariance matrix for an UL transmission received in a current frame (computed at 130) and the history information. The first and second BF+STC weight vectors are applied to a DL transmission (traffic) using a BF-STC transmission technique to send the DL transmission to the particular client device at the next available DL subframe for the particular client device, as depicted in FIG. 4. Thus, according to the techniques described herein, the received UL transmission in a current frame and the covariance matrix (or downlink beamforming weights) from previous frames (referred to herein generally as "history information") are used to estimate the first and second beamforming weight vectors used for BF+STC, which vectors are referred to herein as first and second BF-STC weight vectors. Said another way, the first and second beamforming weight vectors for BF+STC are estimated dynamically based on the covariance matrix for an uplink transmission received in a current frame and the history information.

Figure 5:
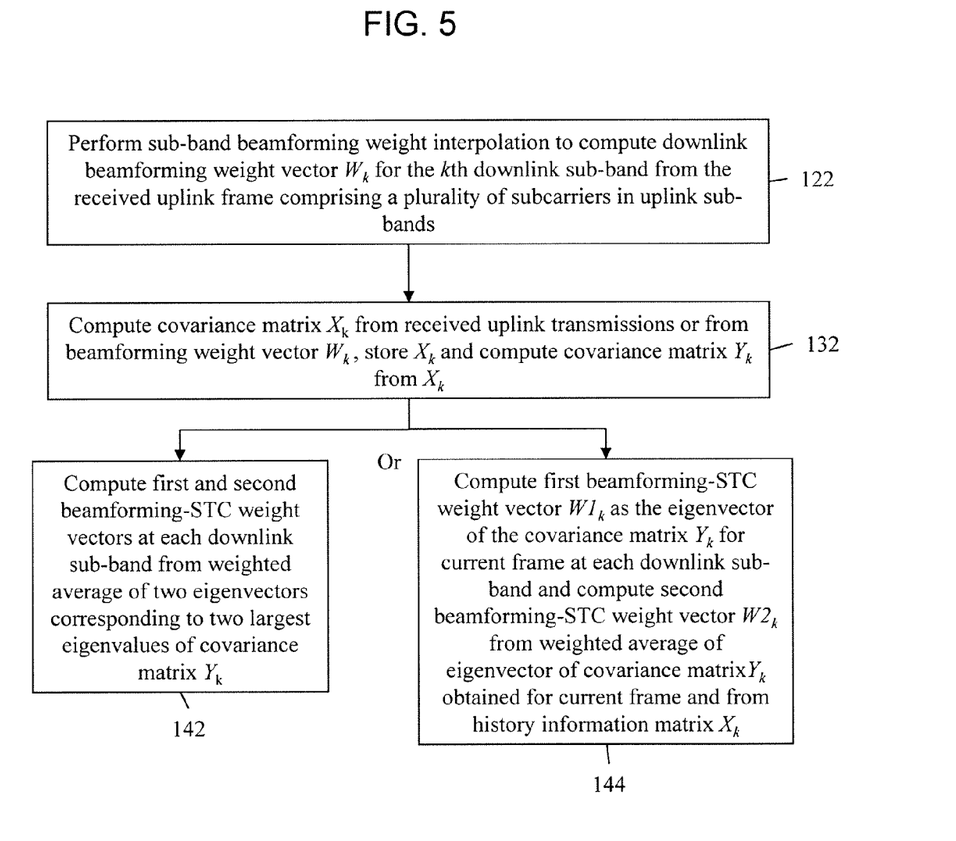
FIG. 5 is an example of a flow chart for a first technique useful to compute the first and second beamforming-space time code weight vectors.

Reference is now made to FIG. 5 for a more detailed description of some of the functions of the process 100. FIG. 5 shows at 122 one example of the beamforming weight vector computation function, one example of the covariance matrix computation function at 132 and two examples of computations functions useful to compute the first and second BF+STC weight vectors at 142 and 144.

At 122, the base station computes a DL beamforming weight vector from received UL transmissions. When the UL subframes and DL subframes are in different frequency ranges, then the base station may perform techniques to derive the DL beamforming weight vectors using information in the different frequency range allocated for the UL transmissions. For example, the base station may perform sub-band beamforming weight interpolation to compute the DL beamforming weight vector $W_k$ for the kth DL sub-band from the received UL transmission that comprises a plurality of subcarriers in UL sub-bands.

The following is a brief description of a sub-band interpolation technique that may be performed at 122. Spatial components associated with reception of the UL transmission at the M plurality of base station antennas are computed. The N strongest spatial components (in magnitude) are selected among the computed spatial components. The DL beamforming weight vector is computed based on the N strongest spatial components. The received signals at the individual antennas of the base station may be represented as $U(p)=\{u_{1(p)}, u_{2(p)} \ldots u_{M(p)}\}$, where $u_{1(p)}$ is the signal received at antenna 12(1) at UL sub-band U(p), $u_{2(p)}$ is the signal received at antenna 12(2) at UL sub-band U(p) and so on. The steering vector (or response vector) for the direction of arrival (DOA) at each sub-band U(p) is obtained by N point Fourier transform $[F_1(p), \ldots, F_N(p)]=\text{FFT}(U(p), N)$.

Then, the strongest N spatial components in magnitude are selected from $F_i$. The strongest N spatial components are designated $i_a$, where a=1 to N. Interpolation at each DL sub-band $D_k$ is then made at each DOA $i_a$, i.e., $E_i(k)$=interpolation $(Fi(1), \ldots, F(P))$, when $i=i_a$, otherwise $E_i(k)$=0. The beamforming weight vector is computed by taking an inverse Fourier transform $W(k)=\text{IFFT}([E_1(k), E_2(k), \ldots, E_N(k)])$, and using the first M components of W(k), where M is the number of antennas at the base station.

At 132, the base station computes a covariance matrix $X_k$ from each received UL transmission, at each sub-band k comprised of a plurality of subcarriers, as explained above in connection with 130 in FIG. 3. In the aforementioned variation, instead of using received UL transmissions, the covariance matrix $X_k$ is computed from the beamforming weight vector $W_k$ computed at 122. A covariance matrix $Y_k$ at DL sub-band k is computed from the covariance matrix $X_k$ and the downlink beamforming weight vector $W_k$. For example, the covariance matrix $Y_k$ is computed as $Y_k = \beta * X_k + (1-\beta) W_k * W_k^H$, where $H$ denotes the Hermitian or conjugate transpose operation, $\beta$ is a positive value between 0 and 1 (e.g., 0.4), and $X_k$ is the covariance matrix computed as explained above.

Again, the covariance matrix $X_k$ is derived from received UL transmissions as explained above or from a history $Wold_k$ of the beamforming weight vector $W_k$ computed for a prior UL transmission. One example is to compute the covariance matrix $$X_k = \alpha Wold_k^*$$
$$Wold_k^H + (1-\alpha) \sum_k W_{ki}^* W_{ki}^H,$$

where $W_{ki}$ are the beamforming weight vectors from some pre-determined DL-sub-bands ki, $H$ denotes the Hermitian or complex conjugate operation and $\alpha$ is a number between 0 and 1 that is fixed or is a function of $W_k$ and $Wold_k$. In either case, the covariance matrix $X_k$ is stored and updated over time from received UL transmissions or from updates to the beamforming weight vector $W_k$.

Moreover, the covariance matrix $X_k$ used in the computation for $Y_k$ may be the same for all DL sub-bands, or different for each DL sub-band. When the covariance matrix $X_k$ is the same for all DL sub-bands, then one useful computation for $X_k$ is $$X_k = \beta * X_k + (1-\beta) \sum_k W_k^* W_k^H,$$

where $H$ is the Hermitian or conjugate transpose operation. When $X_k$ is different for individual DL sub-bands, then $X_k = Y_k$.

Two schemes are described herein for the computation made at 140 to generate the first and second BF+STC weight vectors, which are denoted herein $W1_k$ and $W2_k$. In a first scheme, shown at 142, the first and second BF+STC weight vectors are computed from a weighted average of two eigenvectors corresponding to two largest eigenvalues of the covariance matrix $Y_k$. The first and second BF+STC weight vectors are highly correlated, which approximates performance of standard beamforming, when the condition number of the covariance matrix is large. On the other hand, the first and second BF+STC weight vectors are orthogonal when the condition number of the covariance matrix is close to one. Thus, in this scheme, the first and second BF+STC weight vectors are computed as follows.

$$W1_k = f_{11}(\epsilon_1, \epsilon_2) * \Omega1_k + f_{12}(\epsilon_1, \epsilon_2) * \Omega2_k$$

$$W2_k = f_{21}(\epsilon_1, \epsilon_2) * \Omega1_k + f_{22}(\epsilon_1, \epsilon_2) * \Omega2_k$$

where $\epsilon_1$ and $\epsilon_2$ are the two largest eigenvalues corresponding to the eigenvectors $\Omega1_k$ and $\Omega2_k$ of the covariance matrix $Y_k$, and $f_{11}$, $f_{12}$, $f_{21}$, and $f_{22}$ are functions of $\epsilon_1$ and $\epsilon_2$. For example, the functions $f_{11}$, $f_{12}$, $f_{21}$, and $f_{22}$ are:

$$f_{11}(\epsilon_1, \epsilon_2) = \sqrt{\frac{\epsilon_1}{\epsilon_1 + \epsilon_2}}$$

$$f_{22}(\epsilon_1, \epsilon_2) = \sqrt{\frac{\epsilon_2}{\epsilon_1 + \epsilon_2}} \text{ ; and}$$

$$f_{12}(\epsilon_1, \epsilon_2) = f_{21}(\epsilon_1, \epsilon_2) = 0.$$

In the second scheme, shown at 144, the first beamforming weight vector $W1_k$ is computed as the eigenvector of the covariance matrix $Y_k$ for the received UL transmission of the current frame and the second beamforming weight vector $W2_k$ is computed from a weighted average of (1) an eigenvector $\Omega1_k$ corresponding to the largest eigenvalue of the covariance matrix $Y_k$ from the received UL transmission of the current frame and (2) an eigenvector $\Omega2_k$ corresponding to the largest eigenvalue of the history information represented by the saved covariance matrix $X_k$. The weighted average used to compute the second beamforming weight vector $W2_k$ may be a fixed factor or a function of the two eigenvectors $\Omega1_k$ and $\Omega2_k$ and a factor $T_a$ representing the time interval between the current frame (for which a DL transmission is to be made) and the frame for which the last UL transmission was received from the particular client device to which the DL transmission is to be made.

Figure 6:
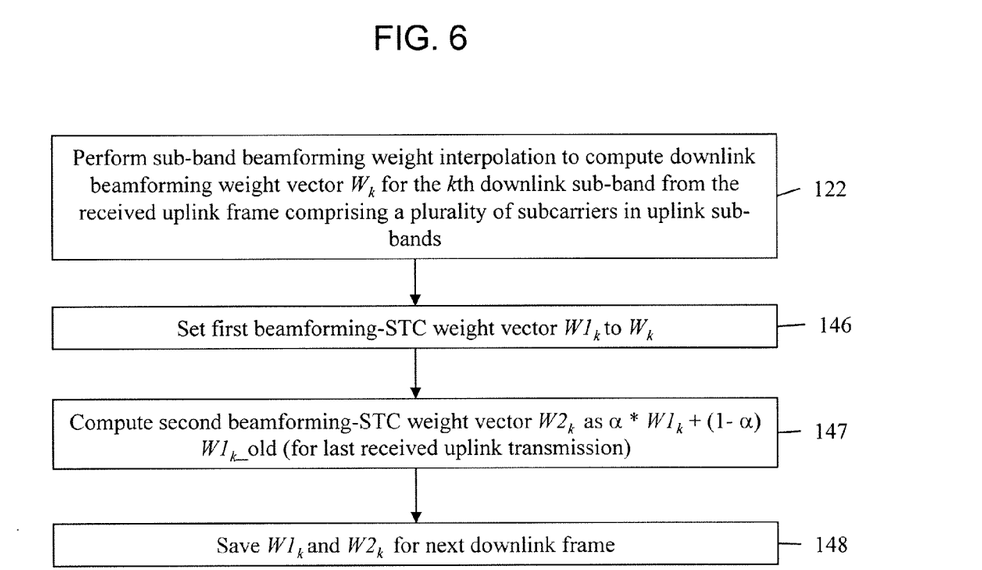
FIG. 6 is an example of a flow chart for a second technique useful to compute the first and second beamforming weight vectors.

Turning now to FIG. 6, still another example of operations for the process 100 is shown. In this example, the singular value decomposition operations needed to compute eigenvalues and eigenvectors (employed in the process shown in FIG. 5) are avoided to reduce implementation complexity. Accordingly, as shown at 122 in FIG. 6, the beamforming weight vector $W_k$ is computed for DL sub-bands k using the technique described above, for example. At 146, the first BF+STC weight vector $W1_k$ is set equal to the DL beamforming weight vector $W_k$. At 147, the second BF+STC weight vector $W2_k$ is computed from the downlink beamforming weight vector $W_k$ and from the first BF+STC vector $W1_k$ computed for a prior downlink transmission. Specifically, the second BF+STC weight vector $W2_k$ is computed as $W2_k = \alpha * W_k (1-\alpha) * W1old_k$, where $\alpha$ is a number between 0 and 1 that is fixed or is a function of $W_k$ and $W1old_k$, and $W1old_k$ is the first beamforming weight vector $W1_k$ computed for a prior downlink transmission to that particular client device. At 148, the first and second BF+STC weight vectors $W1_k$ and $W2_k$ are saved or stored, where $W1_k$ is used as $W1old_k$ for the computation of the first and second BF+STC weight vectors $W1_k$ and $W2_k$ when the next DL transmission is to be made to that particular client device.

Figure 7:
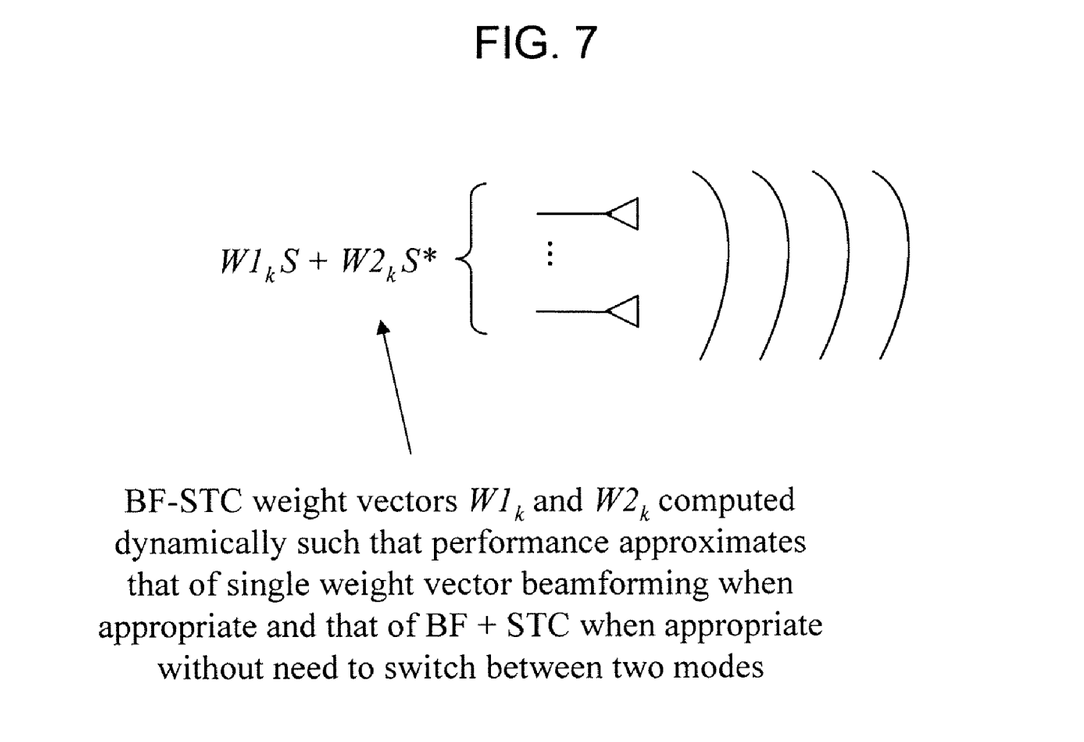
FIG. 7 is an example of a flow chart for a third technique useful to compute the first and second beamforming weight vectors.

Turning to FIG. 7, a diagram is shown that generally depicts the concepts associated with the techniques described herein for computing BF+STC weight vectors. The first and second BF+STC weight vectors $W1_k$ and $W2_k$ are applied using STC techniques, and one example is represented by the mathematical expression $W1_k S + W2_k S^*$, where S is a symbol to be transmitted and * denotes the conjugate operation. The first and second BF+STC weight vectors $W1_k$ and $W2_k$ are computed dynamically such that the resulting performance approximates that of single weight vector beamforming when appropriate (e.g., when a client device is relatively stationary) and that of BF+STC when appropriate (e.g., when a client device is moving) without need to switch between two transmission modes.

The history information of the covariance matrix (contained in $X_k$) provides information about the channel in addition to that obtained for a current frame, in order to compute a reliable second beamforming weight vector $W2_k$ for BF+STC. The first and second BF+STC weight vectors $W1_k$ and $W2_k$ are based on the eigenvalues of the covariance matrix generated based on both spatial data (received signals at multiple antennas) and time data (history information contained in the saved covariance matrix $X_k$ over time). Thus, the variations in frequency and time of the channel are accounted for when computed the first and second BF+STC weight vectors $W1_k$ and $W2_k$.

The use of two beamforming weight vectors provides spatial diversity, making them more robust to aging effects than could be achieved with a single beamforming weight vector. The two weight vectors $W1_k$ and $W2_k$ are highly correlated when the condition number of the covariance matrix is high, in which case the BF+STC operation ($W1_k S + W2_k S^*$) approaches performance of standard beamforming, but still results in accurate estimation of both weight vectors for stationary and low speed moving client devices. The first and second beamforming weight vectors are similar to the two largest eigenvectors of the covariance matrix to provide diversity for mobile client devices.

The above description is by way of example only.

What is claimed is:

1. A method comprising:
at a plurality of antennas of a first wireless communication device, receiving uplink transmissions sent from a second wireless communication device;
generating a downlink beamforming weight vector from the received uplink transmissions;
computing a covariance matrix based on at least one of the received uplink transmissions and the downlink beamforming weight vector;
storing history information based on the covariance matrices for the received uplink transmissions; and
computing first and second beamforming-space time code weight vectors based on the covariance matrix for an uplink transmission received in a current frame and the history information, wherein the first and second beamforming-space time code weight vectors are used for a beamforming-space time code transmission technique to send a downlink transmission to the second wireless communication device.

2. The method of claim 1, wherein computing the covariance matrix comprises computing a covariance matrix $X_k$ from at least one of the received uplink transmissions and the downlink beamforming weight vector $W_k$ at uplink sub-bands k, and storing comprises storing the covariance matrix $X_k$ for the uplink transmissions received over time.

3. The method of claim 2, and further comprising computing a covariance matrix $Y_k$ for downlink sub-bands k from the covariance matrix $X_k$, and wherein computing the first and second beamforming-space time code weight vectors comprises computing two eigenvectors corresponding to the two largest eigenvalues of the covariance matrix $Y_k$ based on an uplink transmission received in a current frame, and computing a weighted average from the two eigenvectors.

4. The method of claim 3, wherein computing the first and second beamforming-space time code weight vectors comprises computing the first beamforming-space time code weight vector $W1_k$ as $f_{11}(\epsilon_1, \epsilon_2)^* \Omega1_k + f_{12}(\epsilon_1, \epsilon_2)^* \Omega2_k$ and computing the second beamforming-space time code weight vector $W2_k$ as $f_{21}(\epsilon_1, \epsilon_2)^* \Omega1_k + f_{22}(\epsilon_1, \epsilon_2)^* \Omega2_k$, where $\Omega1_k$ and $\Omega2_k$ are eigenvectors corresponding to the two largest eigenvalues $\epsilon_1$ and $\epsilon_2$ of the covariance matrix $Y_k$, and $f_{11}$, $f_{12}$, $f_{21}$, and $f_{22}$ are functions of eigenvalues $\epsilon_1$ and $\epsilon_2$.

5. The method of claim 2, wherein computing the first and second beamforming-space time code weight vectors comprises computing the first beamforming-space time code weight vector $W1_k$ as an eigenvector of the covariance matrix $Y_k$ for the received uplink transmission of a current frame and computing the second beamforming-space time code weight vector $W2_k$ from a weighted average of (1) an eigenvector corresponding to the largest eigenvalue of the covariance matrix $Y_k$ from the received uplink transmission of the current frame and (2) an eigenvector corresponding to the largest eigenvalue of the covariance matrix $X_k$ representing the history information.

6. The method of claim 5, wherein computing the second beamforming weight vector $W2_k$ is based on a weighted average that is a function of a time interval between the current frame and the frame for which a last uplink transmission was received.

7. The method of claim 2, wherein computing the first and second beamforming-space time code weight vectors comprises computing the first beamforming-space time code weight vector $W1_k$ as $W1_k = W_k$, and computing the second beamforming-space time code weight vector $W2_k$ from the downlink beamforming weight vector $W_k$ and from the first beamforming-space time code vector $W1_k$ computed for a prior downlink transmission.

8. The method of claim 1, wherein computing the first and second beamforming-space time code weight vectors comprises dynamically computing the first and second beamforming-space time code weight vectors according to changing channel conditions between the first wireless communication device and the second wireless communication device such that when the second wireless communication device is stationary or relatively slow moving, the first and second beamforming-space time code weight vectors achieve performance at the second wireless communication device that approximates beamforming without space time coding, and when the second wireless communication device is moving, the first and second beamforming-space time code weight vectors achieve performance of space time coding.

9. The method of claim 1, and further comprising applying the first and second beamforming-space time code vectors $W1_k$ and $W2_k$ to a downlink transmission symbol S such that $W1_k S + W2_k S^*$.

10. An apparatus comprising:
a plurality of antennas;
a receiver configured to be coupled to the plurality of antennas and to produce receive signals associated with transmissions received at the plurality of antennas;
a transmitter configured to be coupled to the plurality of antennas and to produce transmit signals to be transmitted via the plurality of antennas;
a controller configured to be coupled to the transmitter and the receiver, wherein the controller is configured to:
generate a downlink beamforming weight vector from received uplink transmissions;
compute a covariance matrix based on at least one of the received uplink transmissions and the downlink beamforming weight vector;
store history information based on the covariance matrices for the received uplink transmissions; and
compute first and second beamforming-space time code weight vectors based on the covariance matrix for an uplink transmission received in a current frame and the history information.

11. The apparatus of claim 10, wherein the controller is configured to compute the covariance matrix by computing a covariance matrix $X_k$ from at least one of the received uplink transmissions and the downlink beamforming weight vector $W_k$ at uplink sub-bands k, and configured to store the covariance matrix $X_k$ for the uplink transmission received over time.

12. The apparatus of claim 11, wherein the controller is further configured to compute a covariance matrix $Y_k$ for downlink sub-bands k from the covariance matrix $X_k$, and to compute the first and second beamforming-space time code weight vectors by computing two eigenvectors corresponding to the two largest eigenvalues of the covariance matrix $Y_k$ based on an uplink transmission received in a current frame, and computing a weighted average from the two eigenvectors.

13. The apparatus of claim 12, wherein the controller is configured to compute the first and second beamforming-space time code weight vectors by computing the first beamforming-space time code weight vector $W1_k$ as $f_{11}(\epsilon_1, \epsilon_2)*\Omega1_k + f_{12}(\epsilon_1, \epsilon_2)*\Omega2_k$ and computing the second beamforming-space time code weight vector $W2_k$ as $f_{21}(\epsilon_1, \epsilon_2)*\Omega1_k + f_{22}(\epsilon_1, \epsilon_2)*\Omega2_k$, where $\Omega1_k$ and $\Omega2_k$ are eigenvectors corresponding to the two largest eigenvalues $\epsilon_1$ and $\epsilon_2$ of the covariance matrix $Y_k$, and $f_{11}, f_{12}, f_{21}$, and $f_{22}$ are functions of eigenvalues $\epsilon_1$ and $\epsilon_2$.

14. The apparatus of claim 11, wherein the controller is configured to compute the first and second beamforming-space time code weight vectors by computing the first beamforming-space time code weight vector $W1_k$ as an eigenvector of the covariance matrix $Y_k$ for the received uplink transmission of a current frame and computing the second beamforming-space time code weight vector $W2_k$ from a weighted average of (1) an eigenvector corresponding to the largest eigenvalue of the covariance matrix $Y_k$ from the received uplink transmission of the current frame and (2) an eigenvector corresponding to the largest eigenvalue of the covariance matrix $X_k$ representing the history information.

15. The apparatus of claim 10, wherein the controller is configured to apply the first and second beamforming-space time code vectors $W1_k$ and $W2_k$ to a downlink transmission symbol S to be sent to a wireless communication device from which the uplink transmissions are received, such that $W1_kS + W2_kS^*$.

16. A processor readable medium encoded with instructions that, when executed by a processor, cause the processor to:
generate a downlink beamforming weight vector from uplink transmissions received at a plurality of antennas of a first communication device from a second communication device;
compute a covariance matrix based on at least one of the received uplink transmissions and the downlink beamforming weight vector;
store history information based on the covariance matrices for the received uplink transmissions; and
compute first and second beamforming-space time code weight vectors based on the covariance matrix for an uplink transmission received in a current frame and the history information, wherein the first and second beamforming-space time code weight vectors are used for a beamforming-space time code transmission technique to send a downlink transmission to the second wireless communication device.

17. The processor readable medium of claim 16, wherein the instructions that cause the processor to compute the covariance matrix comprises instructions configured to cause the processor to compute a covariance matrix $X_k$ from at least one of the received uplink transmissions and the downlink beamforming weight vector $W_k$ at uplink sub-bands k, and the instructions that cause the processor to store comprise instructions configured to cause the processor to store the covariance matrix $X_k$ for uplink transmissions received over time.

18. The processor readable medium of claim 17, and further comprising instructions that are configured to cause the processor to compute a covariance matrix $Y_k$ for downlink sub-bands k from the covariance matrix $X_k$, and wherein the instructions that cause the processor to compute the first and second beamforming-space time code weight vectors comprises instructions that cause the processor to compute two eigenvectors corresponding to the two largest eigenvalues of the covariance matrix $Y_k$ based on an uplink transmission received in a current frame, and to compute a weighted average from the two eigenvectors.

19. The processor readable medium of claim 17, wherein the instructions that cause the processor to compute the first and second beamforming-space time code weight vectors comprise instructions configured to cause the processor to compute the first beamforming-space time code weight vector $W1_k$ as an eigenvector of the covariance matrix $Y_k$ for the received uplink transmission of a current frame and computing the second beamforming-space time code weight vector $W2_k$ from a weighted average of (1) an eigenvector corresponding to the largest eigenvalue of the covariance matrix $Y_k$ from the received uplink transmission of the current frame and (2) an eigenvector corresponding to the largest eigenvalue of the covariance matrix $X_k$ representing the history information.

20. The processor readable medium of claim 17, wherein the instructions that cause the processor to compute the first and second beamforming-space time code weight vectors comprise instructions that are configured to cause the processor to compute the first beamforming-space time code weight vector $W1_k$ as $W1_k = W_k$, and to compute the second beamforming-space time code weight vector $W2_k$ from the beamforming weight vector $W_k$ and from the first beamforming-space time code vector $W1_k$ computed for a prior downlink transmission.

* * * * *